Inventors:
Frederick F. Rust
Lee M. Porter
William E. Vaughan
By Alan C. Batchelder
their Agent

United States Patent Office 2,871,102
Patented Jan. 27, 1959

2,871,102
PROCESS FOR THE PRODUCTION OF HYDROGEN PEROXIDE

Frederick F. Rust, Orinda, Lee M. Porter, Richmond Annex, and William E. Vaughan, Berkeley, Calif., assignors to Shell Development Company, Emeryville, Calif., a corporation of Delaware Application August 18, 1951, Serial No. 244,762

19 Claims. (Cl. 23—207)

This invention pertains to a process for the production of hydrogen peroxide and it more particularly pertains to a certain improved process for the production of hydrogen peroxide by oxidation of secondary alcohols in liquid state with molecular oxygen.

In copending application Serial No. 130,852, filed December 2, 1949, there is described and claimed a process for the production of hydrogen peroxide by oxidation of secondary alcohols, such as isopropyl alcohol, in liquid state by treatment with molecular oxygen-containing gas at elevated temperatures, preferably between about 90° C. and about 140° C. The process is carried out by passing a stream of molecular oxygen-containing gas, e. g., molecular oxygen or air under superatmospheric pressure into and through a quantity of the liquid secondary alcohol at a rate such that the liquid alcohol is substantially saturated with molecular oxygen at all times. The reaction vessel, which desirably is of spherical or equivalent form such that it is characterized by a low ratio of surface area to volume desirably is one which has been previously conditioned, e. g., by repeated use in non-catalytic oxidation of alcohols or hydrocarbons in liquid phase or by treatment with a stabilizer for hydrogen peroxide as disclosed and claimed in copending application Serial No. 180,694, filed August 21, 1950, reference to the disclosures thereof hereby being made. A reaction initiator, such as an organic peroxide or hydrogen peroxide itself, desirably is added to the secondary alcohol at the outset as initiator of the necessary reaction. In batchwise operation of the process, as the oxidation of the secondary alcohol progresses hydrogen peroxide is formed and accumulates in the liquid reaction mixture until the concentration may be as high as 15% or 20%, or even more. The process may be operated in a continuous manner, for example, by continuously adding the alcohol to the liquid reaction mixture and withdrawing liquid reaction mixture from the reaction vessel at rates adjusted to maintain constant volume of reaction mixture and constant concentration of hydrogen peroxide therein. The hydrogen peroxide may be recovered by diluting the reaction mixture containing hydrogen peroxide with water and fractionally distilling the diluted mixture or by other suitable methods. Yields of hydrogen peroxide better than 90%, based upon the amount of secondary alcohol consumed, are readily obtainable. For further description of the process, reference is hereby made to said copending application Serial No. 130,852.

The present invention is based upon the discovery that under otherwise equivalent conditions hydrogen peroxide can be produced at an increased rate of production when there are present in solution in the secondary alcohol undergoing oxidation (a) certain minute amounts of heavy metal and (b) a stoichiometrically greater amount, relative to the heavy metal, of a sequestrative stabilizer for hydrogen peroxide. Expressed otherwise, there is obtained a higher rate of consumption of molecular oxygen, or a higher over-all reaction rate, without material decrease in yield of hydrogen peroxide. The favorable effect of the heavy metal is dependent upon the simultaneous presence of the sequestrative hydrogen peroxide stabilizer. Thus, the presence of heavy metal alone, even in the small amounts contemplated according to the invention, is inimical to the formation of hydrogen peroxide, an observation which appears to be in full accord with the well-known fact that ions of many heavy metals are extremely active catalysts for decomposition of hydrogen peroxide. While we do not wish to be bound by any theory, it seems possible that the sequestrative hydrogen peroxide stabilizer and the heavy metal ion combine to form a soluble complex, association product, or compound which, in the extremely small amounts involved, functions as a selective catalyst for the desired reaction which may be exemplified by the equation

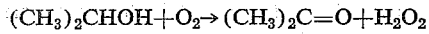

$$(CH_3)_2CHOH + O_2 \rightarrow (CH_3)_2C{=}O + H_2O_2$$

Only extremely small amounts of heavy metal are employed in accordance with the invention. The total concentration of heavy metal in the secondary alcohol undergoing oxidation should not exceed 0.001% by weight, and the preferred maximum is 0.00015% by weight. The high activity of the complex or reaction product as a catalyst for the reaction, if that be the explanation of the observed effect, is evidenced by the fact that as little as 0.00003% by weight of cobalt (added in the form of a soluble salt) employed in conjunction with a sequestrative stabilizer for hydrogen peroxide, such as orthophosphoric acid, has been observed to have a pronounced accelerating effect upon the desired reaction. Amounts of chromium as low as 0.000001% by weight of the secondary alcohol have been observed to noticeably increase the rate of production of hydrogen peroxide when present with sodium pyrophosphate or with orthophosphoric acid. The minimum practical concentration of heavy metal differs somewhat between the different heavy metals and thus cannot be stated in terms of a precise generally applicable figure. It may be stated that concentrations of heavy metal greater than $1 \times 10^{-7}\%$ by weight generally are used according to the invention.

The sequestrative stabilizer for hydrogen peroxide is employed in an amount sufficient to combine with, sequester, or unite with the heavy metal that is present in solution. It thus is employed in an amount at least equal to and preferably greater than the amount that is stoichiometrically equivalent to the heavy metal in solution. Since the presence of an excess of the stabilizer does no harm and frequently is even beneficial, an excess, on a stoichiometric basis, of the stabilizer desirably is provided. The stabilizer can be employed in amounts up to 0.05% by weight of the reaction mixture or even more, although a preferred general maximum is about 0.01% by weight.

The heavy metal ordinarily is added to the reaction mixture, as by direct addition to the mixture undergoing oxidation or to the liquid feed, in the form of a soluble salt or more conveniently a dilute solution of the soluble salt. Illustrative salts of heavy metals that can be employed include, among others, inorganic salts such as chlorides or other halides, sulfates, nitrates, carbonates, etc. and organic salts such as carboxylic acid salts, e. g., acetates, propionates, butyrates, laurates, naphthenates, benzoates, etc., and chelate salts, or chelate complexes with dicarbonyl compounds, e. g., with beta-diketones, such as acetylacetonates, isovalerylacetonates, butyrylacetonates, etc. Since the only known requirement is that the salt be sufficiently soluble to provide in solution the small amount of heavy metal defined hereinabove, it will be apparent that these as well as other salts of heavy metals containing a wide variety of anionic radicals can be used. It also will be noted that the salt may be formed in situ, as by reaction between the heavy metal per se, or oxide or hydroxide, and the acid corresponding to the desired anionic radical.

As the heavy metal there may be employed, broadly speaking, any metal of the class generally known and referred to as the heavy metals. By the term heavy metals we refer to metals which have a specific gravity greater than 4.0 (Hackh's Chemical Dictionary, third edition). It is believed that the observed catalytic function in the process of the present invention may be based in part upon rapid, continuing, cyclic oxidation and reduction of the heavy metal between higher and lower levels of positive valency. The heavy metal thus should be an electropositive heavy metal, or one that is readily oxidized or that readily forms compounds of positive valence number. The base heavy metals of groups V, VI, VII and VIII of the periodic table of the elements, as well as copper, are contemplated by the invention. These include such elements as Mo, Co, Fe, Ni, Mn, Cr, V, W, Ta and Cb. The heavy metals having atomic numbers greater than 22 but less than 30 are preferred, copper however being less desirable than the other members of this group. Although cobalt is a preferred heavy metal because of the high reaction rates and yields of hydrogen peroxide that may be obtained therewith in accordance with the invention, iron, chromium, manganese, nickel, and vanadium are also included among the heavy metals that are employed according to a preferred aspect of the invention. Typical specific compounds which may be employed for introduction of the heavy metal into the reaction mixture include, among others, cobalt acetate, naphthenate, isovalerylacetonate, butyrate; iron chloride, acetonylacetonate, valerate; nickel nitrate, propionate, sulfate; manganese acetate, lactate, formate, sulfate; chromium acetate, nitrate, oxalate. A single heavy metal or a plurality of heavy metals may be employed.

The hydrogen peroxide stabilizers that are employed in accordance with the invention all are compounds that sequester, that is segregate, abstract, withdraw or envelope from or in highly dilute aqueous solutions thereof ions of heavy metals, such as the ferric, cupric, cobaltic, and the chromic ions. This well-known group of compounds includes such organic compounds as cyanides, alpha-hydroxyquinoline, acetanilide, alpha-benzoyloxy-beta-dimethylamino butyric acid, glycerine phenyl ether, thiourea, sodium salicylate, thymol, albumin, uric acid, acetyl glycol, sodium benzene sulfonate, hexamethylenetetramine, gum arabic, guaiacol, phosphatides, and many others, as well as numerous inorganic compounds, such as salts of the oxy-acids of phosphorus, and the corresponding acids, compounds of tin, aluminum, silicon, magnesium, and the like. For the purposes of the present invention the organic stabilizers are considered to be less desirable than the inorganic stabilizers because under the strongly oxidizing conditions of the process the organic compounds are prone to be destroyed, whereas the inorganic compounds are resistant to such destruction.

Suitable inorganic stabilizers that can be used in the process of the invention fall into two general groups. The first group comprises salts, e. g., alkali metal salts, of the oxy acids of tin, antimony, silicon and aluminum and the hydrous oxides of these elements, e. g., sodium stannate, sodium aluminate, sodium silicate, sodium meta-stannate, alpha-meta-stannic acid, hydrous antimony oxide, freshly precipitated alumina, silicic acid hydrosol and hydrous stannic acid. The second group comprises the oxy-acids of phosphorus and the salts, particularly the alkali metal salts, of the oxy-acids of phosphorus. It thus includes the phosphoric acids, reference thereto including orthophosphoric acid, pyrophosphoric acid, hypophosphoric acid, and the meta-phosphoric acids. Operable salts of phosphoric acids include, for example, sodium pyrophosphate, trisodium orthophosphate, disodium monohydrogen orthophosphate, monosodium dihydrogen orthophosphate, potassium dihydrogen orthophosphate, Knorre's salt, Graham's salt, or sodium hexametaphosphate, and the corresponding salts of potassium, lithium, etc. A single hydrogen peroxide stabilizer or a plurality thereof may be used.

In carrying out the process of the invention the secondary alcohol, e. g., isopropyl alcohol, secondary butyl alcohol, a secondary amyl alcohol, or other secondary alcohol wherein the hydroxyl group is the only functional group, is charged to a carefully cleaned and preferably conditioned pressure-resistant reaction vessel constructed of or at least lined with glass, aluminum, tin, stainless steel or other corrosion resistant material, e. g., a resin. The vessel is equipped with an inlet for introduction of gas below the surface of the liquid contents, an outlet for gas which preferably leads through a condenser for condensing and returning to the vessel any entrained or volatilized portion of the liquid mixture, and the customary thermometer, pressure gauge, heating and cooling means, etc. If the process is to be operated in a continuous manner, the necessary inlet and outlet for charging the alcohol feed and withdrawing reaction mixture are, of course, provided. The charge to the reactor is made up to the desired concentration of soluble heavy metal compound and stabilizer, for example, an amount of a dilute solution of cobalt isovalerylacetonate in the alcohol equivalent to about 0.00009% by weight of cobalt based on the total charge and about 0.0035% by weight of $H_3PO_4$ may be added. In continuous operations, wherein additional alcohol is to be added to the reactor, it will be apparent that the feed may contain previously dissolved therein the requisite amounts of heavy metal compound and stabilizer. The system is brought to the reaction temperature and pressure, temperatures of about 70° C. to about 160° C., preferably 90° C. to 140° C., and pressures up to 1000 pounds per square inch being employed. The preferred oxygen-containing gas is air, both by reason of its low cost and because when using air, explosive compositions liable to be encountered when oxygen (90–100%) is used can more readily be avoided. A peroxide, such as an organic peroxide, e. g., 2,2-(tertiary-butyl-peroxy)butane, or hydrogen peroxide may be added to the reaction mixture as initiator for the desired reaction, still other suitable peroxides being referred to in said application Serial No. 130,852. The peroxide may be added in an amount from about 0.005% to about 3% or more by weight. A vigorous stream of oxygen-containing gas, e. g., air, is passed under pressure into and through the liquid alcohol whereby the alcohol is agitated and is saturated with molecular oxygen at the operating temperature and pressure and is so maintained during the course of the run. During the period that the flow of oxygen-containing gas is continued, hydrogen peroxide is formed and accumulates in the mixture until the concentration may be 20% or even more.

The hydrogen peroxide thus formed may be recovered from the reaction mixture by fractional distillation, preceded by dilution with water, if desired, or by precipitation as a metal peroxide, such as calcium peroxide, from which it may be regenerated according to known methods. Still other methods may be used, as for example extraction with water in those cases where the organic materials are soluble in water to only a limited extent. Ketone, which is formed as a by-product, may be separated and reduced to the secondary alcohol for recycle.

The following examples illustrate certain of the numerous possible specific embodiments of the invention.

*Example I.*—Each of the experiments was carried out by charging to a carefully cleaned and conditioned glass vessel 300 parts by weight of distilled isopropyl alcohol containing added cobalt isovalerylacetone in varying amounts and 0.0035% by weight added $H_3PO_4$. Gaseous oxygen under 35 pounds per square inch pressure was circulated in a vigorous stream through the liquid alcohol at 106° C., thence through a water-cooled condenser arranged for return of condensate to the reaction vessel, and then via a pump back to the reaction vessel. During the run oxygen was added to the system from a calibrated reservoir as required to maintain the pressure constant. The course of the reaction was followed by measuring the volume of oxygen consumed during each run. At the conclusion of each run the yield of hydrogen peroxide was determined by analysis of the reaction mixture.

The results that were observed are described by the curves in Figures 1, 2 and 3 of the drawings.

Figure 1:
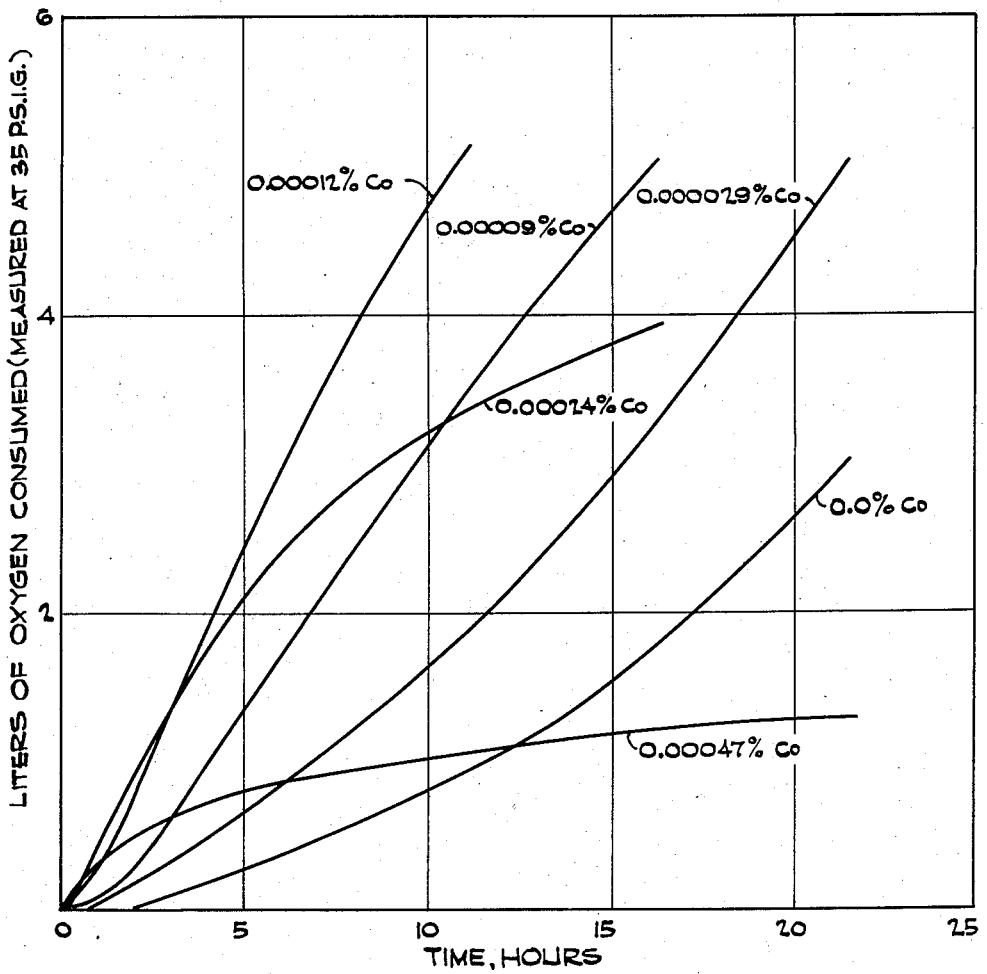
Figure 1 is a plot of the amount of oxygen consumed (a direct measure of the reaction rate) vs. time.
Figure 2:
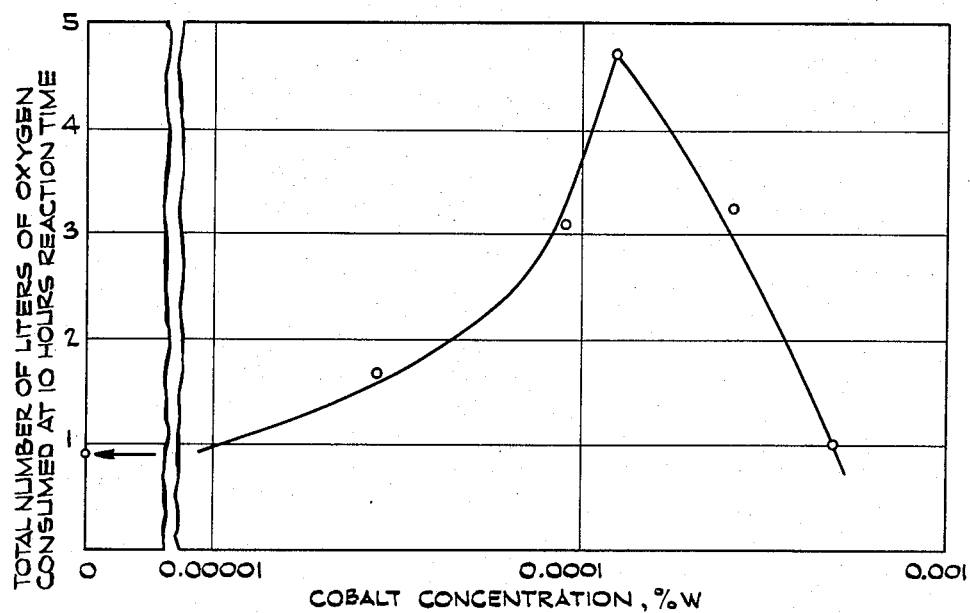
Figure 2 is a semi-logarithmic plot of the total number of liters of oxygen consumed after 10 hours reaction time vs. the concentration of cobalt.
Figure 3:
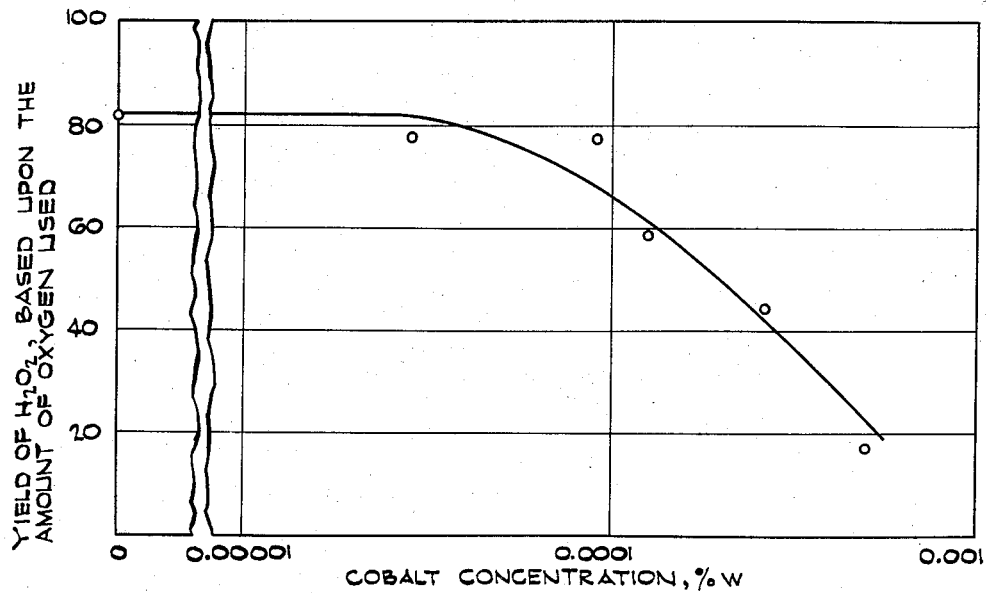
Figure 3 is a semi-logarithmic plot of the yield of $H_2O_2$, based upon the amount of oxygen consumed at the end of each run, vs. the amount of cobalt.

From Figure 2 it will be seen that the rate of absorption of oxygen increases substantially with increasing cobalt concentration up to about 0.00012% cobalt and then rapidly decreases as the concentration of cobalt is further increased. Under the conditions of this series of runs the yield of hydrogen peroxide rapidly decreased as the cobalt concentration was increased above about 0.00009%. Consideration of the three factors: reaction time, yield of hydrogen peroxide, and rate of absorption of oxygen indicates a cobalt concentration of about 0.00009% to be optimum in this series of experiments, although it will be apparent that material advantage, compared to operation in absence of the cobalt, is obtained where there are present amounts of cobalt less than the optimum amount and that somewhat larger amounts can be used without material sacrifice of advantages.

For purposes of comparison, a run was carried out in the presence of 0.0001% by weight of cobalt added as cobalt isovaleryl-acetonate but with no added stabilizer, the other conditions being the same. No formation of hydrogen peroxide was observed during the reaction time of 24 hours.

*Example II.*—This example is carried out to illustrate iron as the heavy metal. To a carefully cleaned glass reactor that had been conditioned by prior use in the oxidation of isopropyl alcohol to produce hydrogen peroxide there were added redistilled aqueous isopropyl alcohol (12.1% by weight of water) and about 1.0% by weight of $H_2O_2$ (90% solution) as initiator. A vigorous stream of gaseous oxygen under 115 pounds per square inch (gauge) pressure was passed through the mixture at 125° C. for 6 hours, effluent from the reactor being passed through a glass water-cooled condenser for condensation and return to the reactor of any volatilized materials. After 6 hours operation the run was discontinued and the amounts of hydrogen peroxide and acetone produced were determined.

A second run was carried out under identical conditions except that 0.0003% by weight of orthophosphoric acid was added to the isopropyl alcohol prior to the commencement of the run.

A third run was the same as the first run except that 0.0001% by weight of iron (as ferric sulfate) was added to the initial mixture.

A fourth run was the same as the third run except that 0.0003% by weight of orthophosphoric acid also was added to the initial mixture.

The results shown in the following table were observed in the four runs:

| Amount of additive | | $H_2O_2$ produced | |
| --- | --- | --- | --- |
| Fe, percent | $H_3PO_4$, percent | Yield, percent [a] | Percent weight [b] |
| None | None | 81 | 4.8 |
| 0.0001 | None | 31 | 3.4 |
| None | 0.0003 | 93 | 5.9 |
| 0.0001 | 0.0003 | 88 | 8.1 |

[a] Based upon amount of acetone produced.
[b] Weight percent based upon total weight of reaction mixture.

It will be seen from the table that, while the presence of but 0.0001% of iron alone led to a marked decrease in the yield and amount of hydrogen peroxide produced, the addition of both 0.0001% of iron and 0.0003% of $H_3PO_4$ led to a substantial (greater than 40%) increase in the amount of hydrogen peroxide formed compared to any of the three other experiments. It also will be seen that despite the presence of the iron a higher yield of hydrogen peroxide was obtained in the run conducted in the presence of both the iron and the $H_3PO_4$ than in the run conducted with neither iron nor $H_3PO_4$ and that the yield was substantially as high as the yield observed in the run employing only the $H_3PO_4$.

*Example III.*—The experiments described in this example, which illustrate the effects of chromium, were carried out in the same manner as the experiments described in Example II. In two of the experiments, sodium pyrophosphate decahydrate was substituted for the orthophosphoric acid. The results shown in the following table were observed. The chromium was added in the form of chromium acetate.

| Amount of additive | | | $H_2O_2$ produced | |
| --- | --- | --- | --- | --- |
| Cr, percent | $H_3PO_4$, percent | $Na_4P_2O_7 \cdot 10 H_2O$, percent | Yield, percent [a] | Percent weight [b] |
| None | 0.0003 | None | 93 | 5.9 |
| 0.000001 | 0.0003 | None | 81 | 11.4 |
| None | None | 0.0005 | 91 | 3.9 |
| 0.000001 | None | 0.0005 | 88 | 6.0 |

[a] Based upon amount of acetone produced.
[b] Weight percent based upon total weight of reaction mixture.

It will be appreciated that numerous other specific embodiments of the invention are within the scope of the appended claims.

We claim as our invention:

1. A process for the production of hydrogen peroxide, which process comprises subjecting to the action of molecular oxygen-containing gas a liquid mixture containing only secondary alcohol as the progenator of hydrogen peroxide having dispersed therein a compound soluble therein at least of one member of the group consisting of copper and the heavy metals of groups V, VI, VII and VIII of the periodic table of the elements and a hydrogen peroxide stabilizer, the content of heavy metal in said liquid being up to about 0.001% by weight.

2. A process for the production of hydrogen peroxide, which process comprises subjecting to the action of a stream of molecular oxygen-containing gas a liquid consisting essentially of a secondary alkanol wherein the hydroxyl group is the only functional group having dispersed therein an association product of at least one member of the group consisting of copper and the heavy metals of groups V, VI, VII and VIII of the periodic table of the elements and at least one phosphorus-containing compound of the group consisting of the phosphoric acids and the alkali metal salts of the phosphoric acids, the content of said heavy metal in said liquid being not over about 0.001% by weight and the content therein of phosphorus-containing compound being not over about 0.05% by weight.

3. A process for the production of hydrogen peroxide defined by claim 2 in which the lower secondary alkanol is isopropyl alcohol.

4. A process for the production of hydrogen peroxide, which process comprises passing a stream of molecular oxygen-containing gas into and through a liquid consisting essentially of a secondary alkanol wherein the hydroxyl group is the only functional group having dispersed therein an association product of at least one member of the group consisting of copper and the heavy metals of groups V, VI, VII and VIII of the periodic table of the elements and a member of the group consisting of the alkali metal salts of the oxy acids of tin, of antimony, of silicon, and of aluminum, and the hydrous oxides of these elements, the content of said heavy metal in said liquid being not over 0.001% by weight and the content of the said alkali metal salt or hydrous oxide, as the case may be, being not over about 0.05% by weight.

5. A process for the production of hydrogen peroxide, which process comprises: forming a solution in a liquid consisting essentially of a secondary alcohol wherein the hydroxyl group is the only functional group of (a) at least one phosphorus-containing compound of the group consisting of the phosphoric acids and the alkali metal salts of the phosphoric acids to a concentration not exceeding about 0.05% by weight, (b) ion of a heavy metal having an atomic number greater than 22 but less than 30 to a concentration not exceeding about 0.00015% by weight, the amount of said phosphorus-containing compound being stoichiometrically greater than the amount of said heavy metal ion; passing molecular oxygen-containing gas into and through the solution at a temperature within the range of from about 70° C. to about 160° C. to form hydrogen peroxide by oxidation of said secondary alcohol; recovering hydrogen peroxide from the solution.

6. A process for the production of hydrogen peroxide, which process comprises: forming a solution in a secondary alcohol wherein the hydroxl group is the only functional group which comprises (a) at least one phosphorus-containing compound of the group consisting of the phosphoric acids and the alkali metal salts of the phosphoric acids to a concentration not exceeding about 0.05% by weight, (b) ferric ion to a concentration not exceeding about 0.001% by weight of iron, the amount of said phosphorus-containing compound being stoichiometrically greater than the amount of said ferric ion; passing molecular oxygen-containing gas into and through the solution at a temperature within the range of from about 70° C. to about 160° C. to form hydrogen peroxide by oxidation of said secondary alcohol; recovering hydrogen peroxide from the solution.

7. A process for the production of hydrogen peroxide, which process comprises: forming a solution in a secondary alcohol wherein the hydroxl group is the only functional group of (a) at least one phosphorus-containing compound of the group consisting of the phosphoric acids and the alkali metal salts of the phosphoric acids to a concentration not exceeding about 0.05% by weight, (b) chromium ion to a concentration not exceeding about 0.001% by weight of chromium, the amount of said phosphorus-containing compound being stoichiometrically greater than the amount of said chromium ion; passing molecular oxygen-containing gas into and through the solution at a temperature within the range of from about 70° C. to about 160° C. to form hydrogen peroxide by oxidation of said secondary alcohol; recovering hydrogen peroxide from the solution.

8. A process for the production of hydrogen peroxide, which process comprises: forming a solution in a secondary alcohol wherein the hydroxl group is the only functional group of (a) at least one phosphorus-containing compound of the group consisting of the phosphoric acids and the alkali metal salts of the phosphoric acids to a concentration not exceeding about 0.05% by weight, (b) cobalt ion to a concentration not exceeding about 0.001% by weight of cobalt, the amount of said phosphorus-containing compound being stoichiometrically greater than the amount of said cobalt ion; passing molecular oxygen-containing gas into and through the solution at a temperature within the range of from about 70° C. to about 160° C. to form hydrogen peroxide by oxidation of said secondary alcohol; recovering hydrogen peroxide from the solution.

9. A process for the production of hydrogen peroxide, which process comprises subjecting to the action of molecular oxygen-containing gas a liquid consisting essentially of a secondary alkanol wherein the hydroxyl group is the only functional group having dispersed therein a compound soluble therein of a heavy metal having an atomic number greater than 22 but less than 30 and at least one phosphorus-containing compound of the group consisting of the phosphoric acids and the alkali metal salts of the phosphoric acids, the content of heavy metal in said liquid being up to about 0.001% by weight and the content of phosphorus-containing compound therein being up to about 0.05% by weight.

10. A process defined by claim 9 in which the liquid is essentially isopropyl alcohol containing minor amounts, relative to the isopropyl alcohol, of acetone, water, and hydrogen peroxide.

11. A process for the production of hydrogen peroxide, which process comprises subjecting to the action of molecular oxygen-containing gas a liquid consisting essentially of a secondary alkanol wherein the hydroxyl group is the only functional group having dispersed therein an association product of iron and at least one phosphorus-containing compound of the group consisting of the phosphoric acids and the alkali metal salts of the phosphoric acids, the content of iron in said liquid being not over about 0.001% by weight and the content of phosphorus-containing compound being not over about 0.05% by weight.

12. A process defined by claim 11 in which the secondary alkanol is isopropyl alcohol.

13. A process defined by claim 11 in which the liquid is constant-boiling mixture of isopropyl alcohol and water.

14. A process for the production of hydrogen peroxide, which process comprises subjecting to the action of molecular oxygen-containing gas a liquid consisting essentially of a secondary alkanol wherein the hydroxyl group is the only functional group having dispersed therein an association product of chromium and at least one phosphorus-containing compound of the group consisting of the phosphoric acids and the alkali metal salts of the phosphoric acids, the content of chromium in said liquid being not over about 0.001% by weight and the content of phosphorus-containing compound being not over about 0.05% by weight.

15. A process defined by claim 14 in which the secondary alkanol is isopropyl alcohol.

16. A process defined by claim 14 in which the liquid is constant-boiling mixture of isopropyl alcohol and water.

17. A process for the production of hydrogen peroxide, which process comprises subjecting to the action of molecular oxygen-containing gas a liquid consisting essentially of a secondary alkanol wherein the hydroxyl group is the only functional group having dispersed therein an association product of cobalt and at least one phosphorus-containing compound of the group consisting of the phosphoric acids and the alkali metal salts of the phosphoric acids, the content of cobalt in said liquid being not over about 0.001% by weight and the content of phosphorus-containing compound being not over about 0.05% by weight.

18. A process defined by claim 17 in which the secondary alkanol is isopropyl alcohol.

19. A process defined by claim 17 in which the liquid is constant-boiling mixture of isopropyl alcohol and water.

References Cited in the file of this patent

UNITED STATES PATENTS

| | | |
|---|---|---|
| 2,120,430 | Rieche | June 14, 1938 |
| 2,215,883 | Riedl et al. | Sept. 24, 1940 |
| 2,479,111 | Harris | Aug. 16, 1949 |
| 2,689,169 | Hinegardner | Sept. 14, 1954 |

FOREIGN PATENTS

| | | |
|---|---|---|
| 435,401 | Great Britain | Sept. 17, 1935 |

OTHER REFERENCES

Thorpe: "Dictionary of Applied Chemistry," 1916, vol. III, page 69.

UNITED STATES PATENT OFFICE
CERTIFICATE OF CORRECTION

Patent No. 2,871,102                                      January 27, 1959

Frederick F. Rust et al.

It is hereby certified that error appears in the printed specification of the above numbered patent requiring correction and that the said Letters Patent should read as corrected below.

Column 6, line 59, for "therein at least of one" read -- therein of at least one --.

Signed and sealed this 31st day of May 1960.

(SEAL)
Attest:

KARL H. AXLINE                               ROBERT C. WATSON
Attesting Officer                            Commissioner of Patents